April 10, 1945. W. V. MYER 2,373,409
BUILDING CONSTRUCTION
Filed Feb. 27, 1942 10 Sheets-Sheet 1

Inventor
WILBUR V. MYER,
By Clarence A. O'Brien
and Harvey B. Jacobson
Attorneys April 10, 1945.   W. V. MYER   2,373,409
BUILDING CONSTRUCTION
Filed Feb. 27, 1942    10 Sheets-Sheet 2

Inventor

WILBUR V. MYER,

By *Clarence A. O'Brien and Harvey B. Jacobson*
Attorneys

Inventor
WILBUR V. MYER,
By Clarence A. O'Brien
and Harvey B. Jacobson
Attorneys

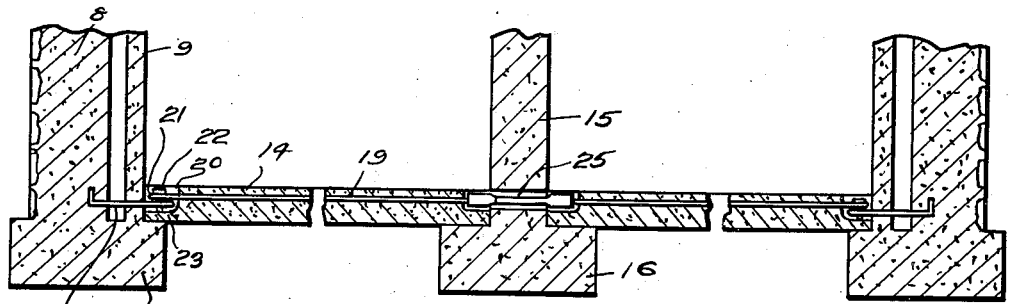
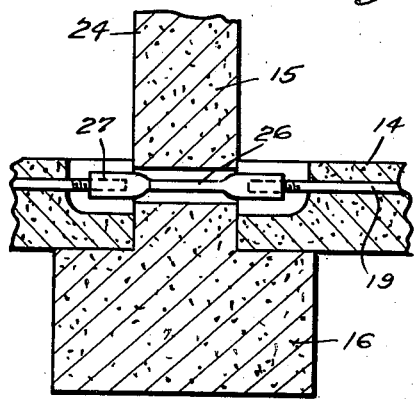
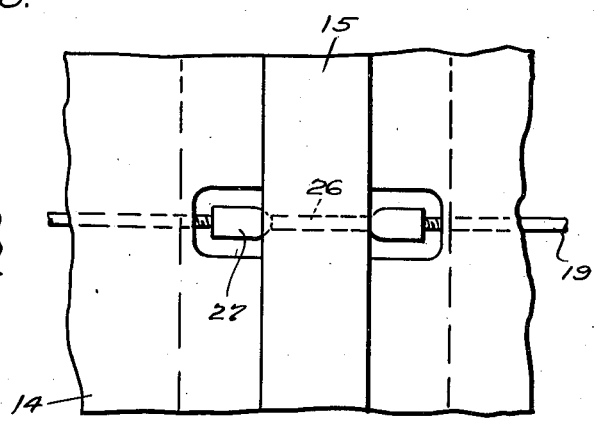
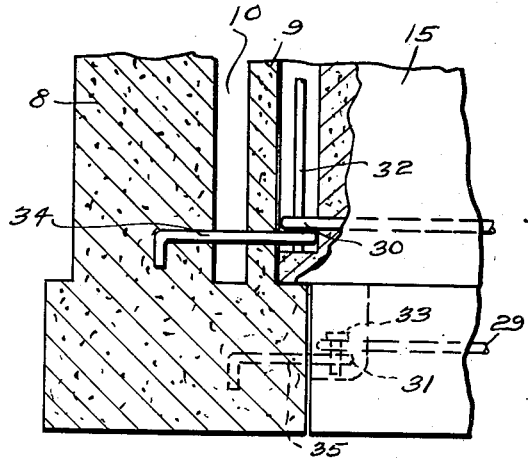
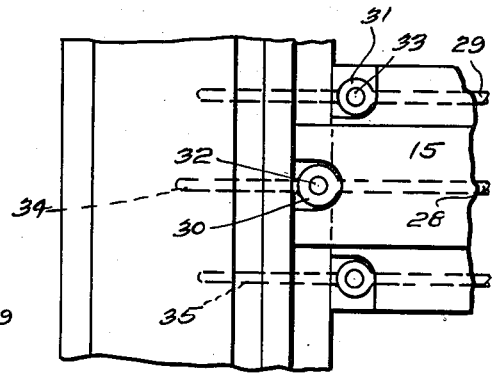

April 10, 1945.  W. V. MYER  2,373,409
BUILDING CONSTRUCTION
Filed Feb. 27, 1942  10 Sheets-Sheet 5

Inventor
WILBUR V. MYER,

By Clarence A. O'Brien
and Harvey B. Jackson
Attorneys

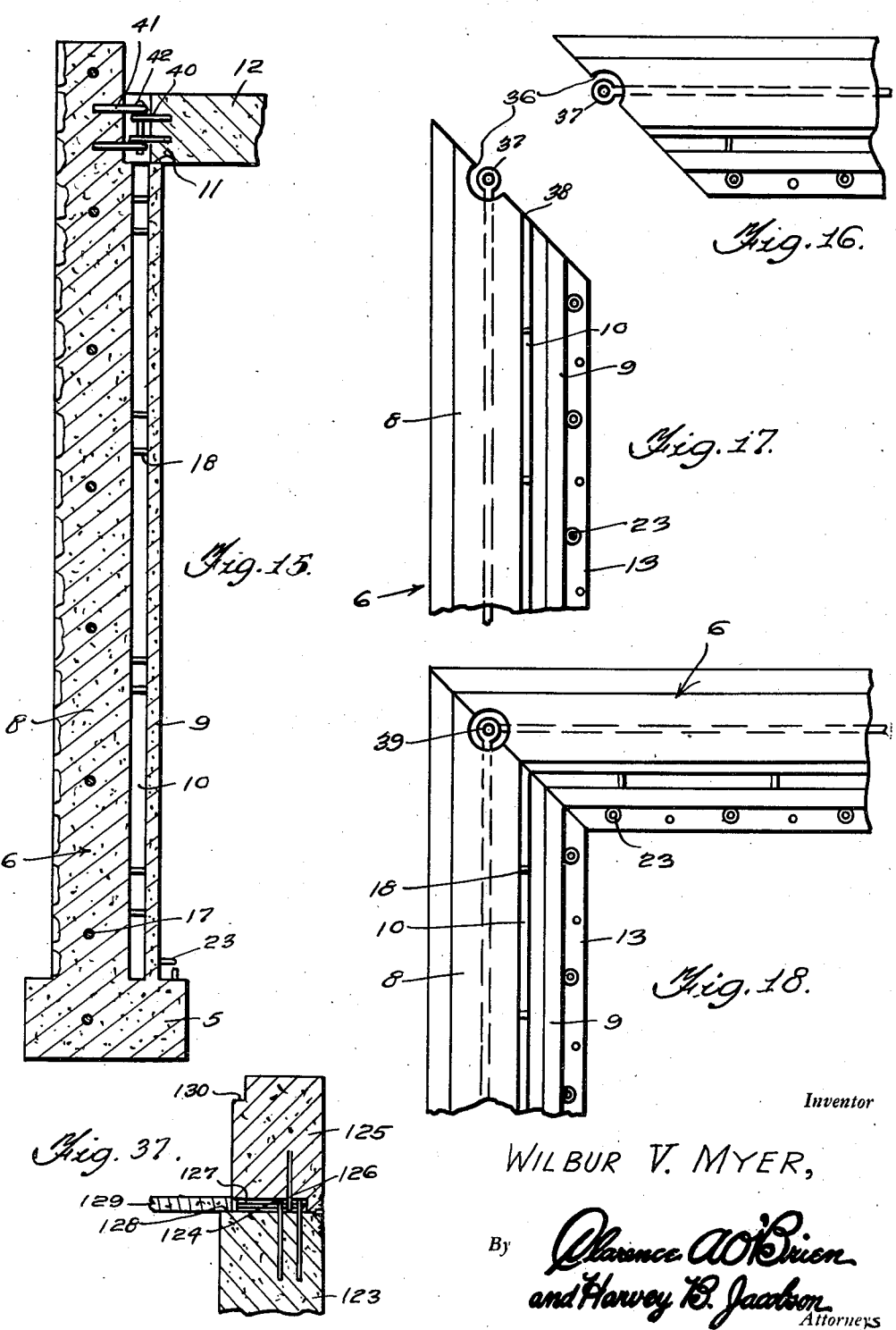

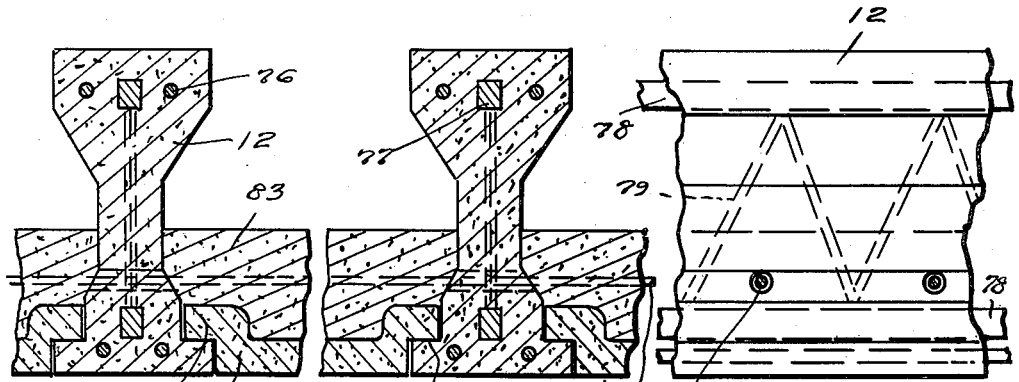
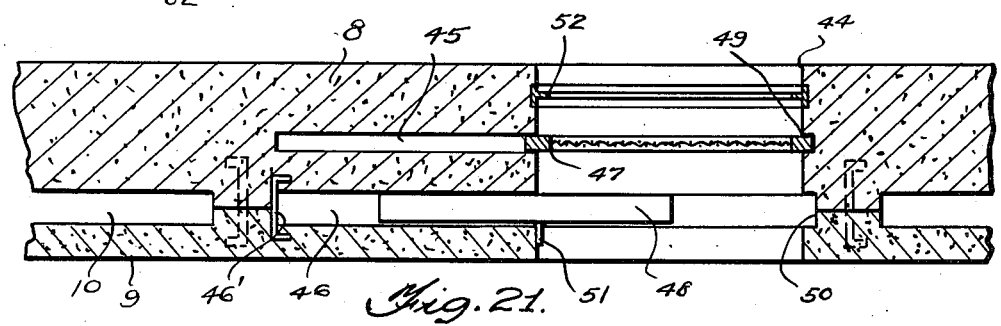
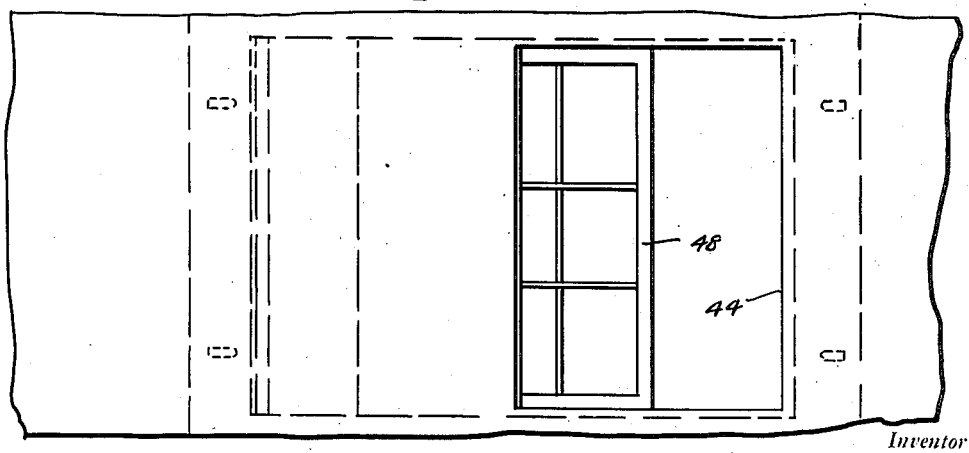

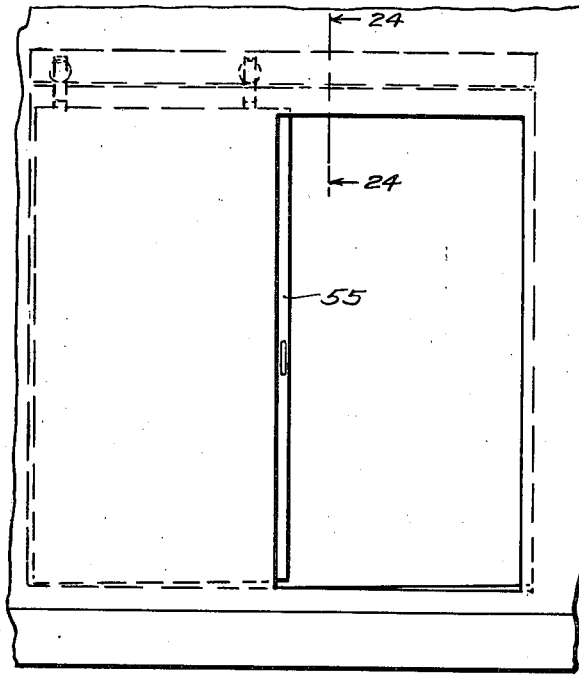
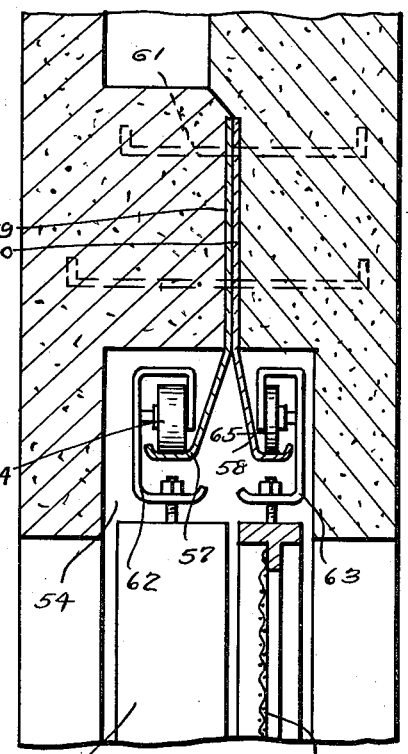
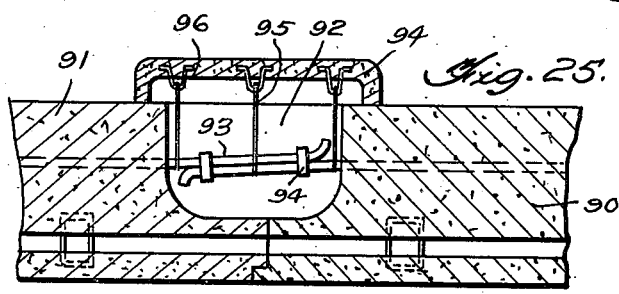
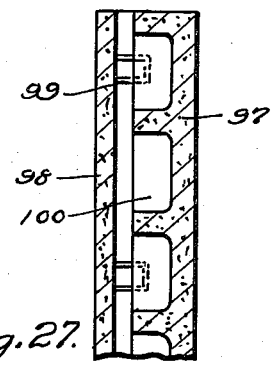
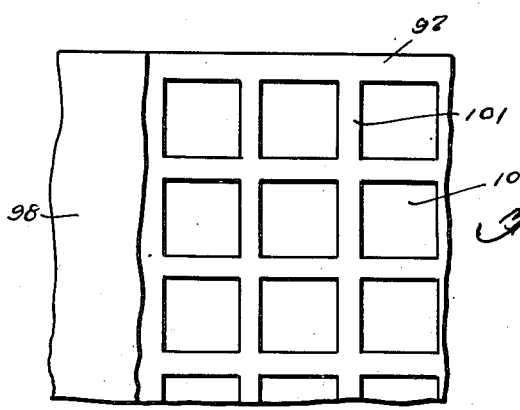

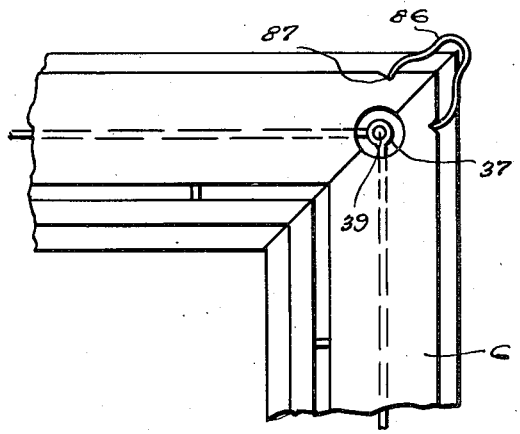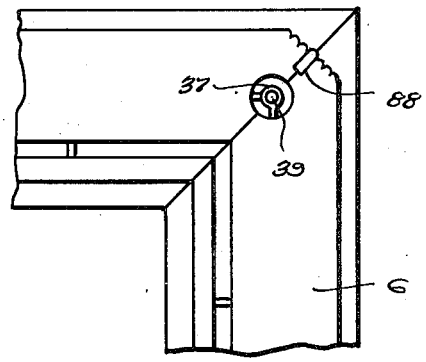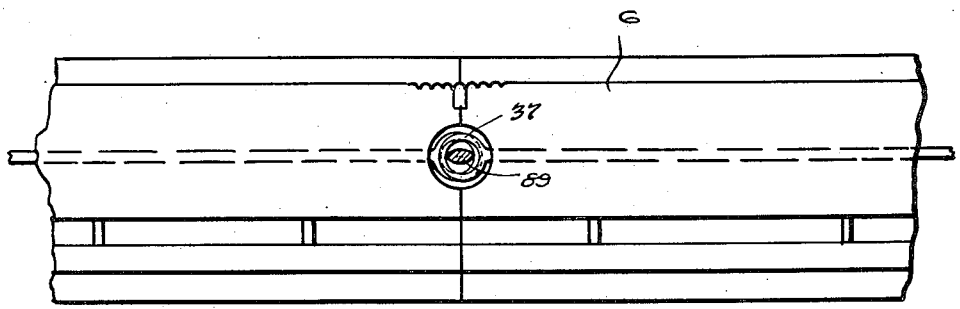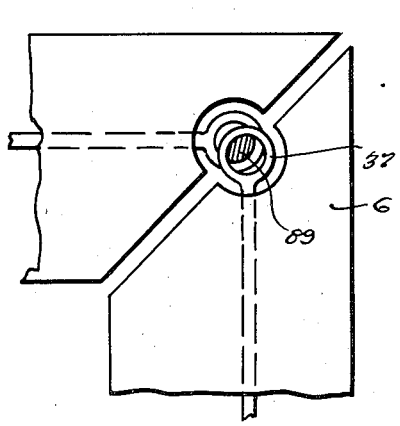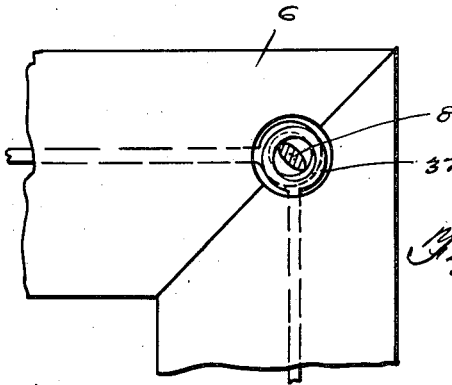

Patented Apr. 10, 1945

2,373,409

UNITED STATES PATENT OFFICE 2,373,409

BUILDING CONSTRUCTION

Wilbur V. Myer, San Diego, Calif.

Application February 27, 1942, Serial No. 432,698

1 Claim. (Cl. 72—107)

The present invention relates to new and useful improvements in building construction and has for its primary object to provide a method of constructing buildings of precast units including wall, ceiling, floor and roof units, and in which all of the units entering into the construction of the building may be precast either on the site or remote from the site and embodying means for assembling and securing the several units into a strong, durable, and attractive building.

One of the important objects of the present invention is to provide wall units for the building including integrally cast inner and outer spaced wall sections to provide an insulating air space therebetween, the wall being formed of plastic material and adapted to have facing stones embedded in the outer surface thereof.

Another object is to provide reinforcing means for the wall sections and also embodying means for securing the abutting edges of the wall sections rigidly together.

Another object is to provide novel means for anchoring the floor and ceiling units to the wall units.

A further object is to provide a novel foundation construction as well as a novel roof construction, all formed of precast units.

An additional object is to provide sliding windows and doors adapted for movement into and out of position in recesses in the walls of the building.

An additional object is to provide a building construction which may be built of curved as well as straight walls, which is completely fireproof, in which the units forming the structure may be assembled without the need of skilled labor and which is otherwise economical to construct.

Other objects and advantages reside in the details of construction as more fully hereinafter described and claimed, reference being had to the accompanying drawings forming part hereof, wherein like numerals refer to like parts throughout and in which:

Figure 8 is a fragmentary vertical sectional view through the foundation.

Figure 9 is a similar view of the foundation for the partition wall.

Figure 10 is a fragmentary top plan view of the partition wall.

Figure 11 is a fragmentary detail, with parts in section of the anchoring means between the partition wall and one of the exterior walls.

Figure 12 is a fragmentary top plan view thereof.

Figure 15 is a vertical transverse sectional view of one of the outer wall units.

Figure 16 is a fragmentary top plan view of one end of one wall unit.

Figure 17 is a similar view of an adjoining right angle wall unit.

Figure 18 is a similar view of the two units in connected relation.

Figure 19 is a fragmentary sectional view through the ceiling and ceiling beams.

Figure 20 is a fragmentary side elevational view of one of the beams.

Figure 21 is a horizontal sectional view through a window opening showing the sliding windows therein.

Figure 22 is a view in elevation of the window opening.

Figure 23 is a similar view of a door opening.

Figure 24 is a sectional view taken substantially on a line 24—24 of Figure 23.

Figure 25 is a fragmentary sectional view of a construction for tying the abutting edges of the walls of a larger building construction.

Figure 26 is a fragmentary elevational view of a modified wall construction.

Figure 27 is a vertical sectional view thereof.

Figure 28 is a fragmentary plan view of the corner of the building illustrating one form of corner protector.

Figure 29 is a similar view showing a caulking strip for the adjoining edges of the wall.

Figure 30 is a fragmentary top plan view of the connected edges of a pair of wall units showing a caulking strip therefor.

Figure 31 is a fragmentary plan view illustrating a modified tie rod construction for the corner of the building.

Figure 32 is a similar view showing the tie rod drawing the units together.

Figure 37 is a vertical sectional view of a modified anchoring construction for the walls of a portable building.

Figure 13:
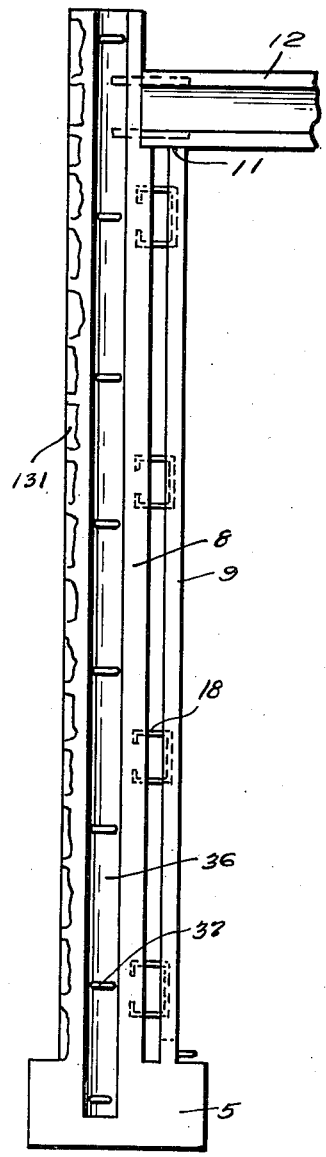
Figure 13 is an edge elevational view of one of the outer wall units.
Figure 14:
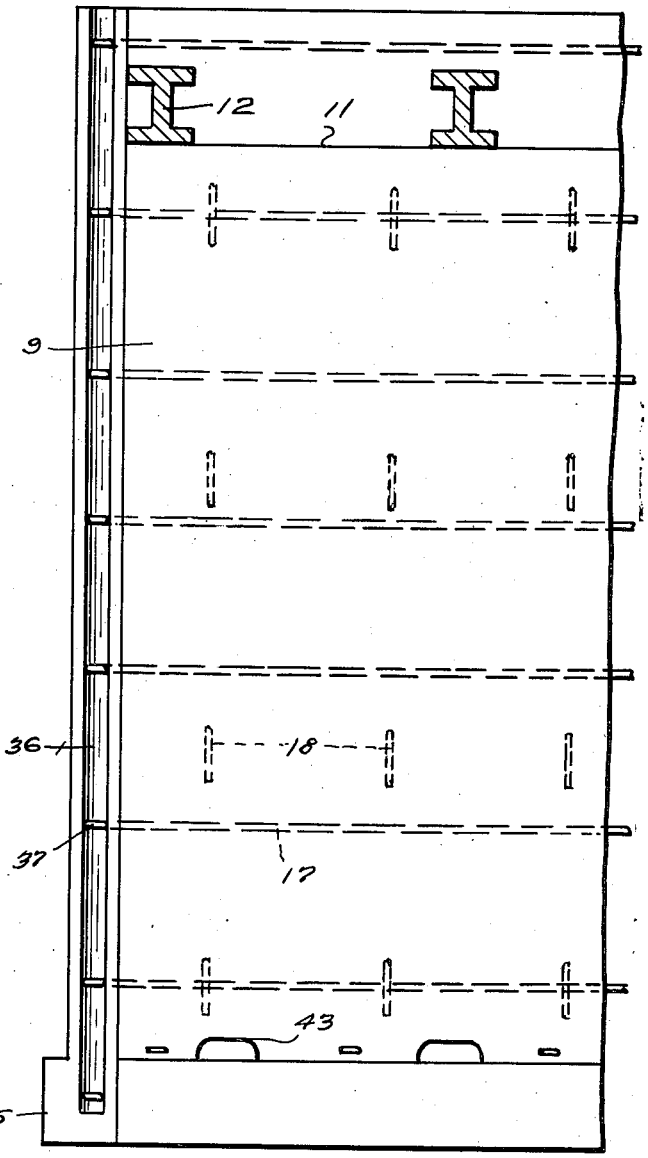
Figure 14 is a fragmentary elevational view of the inside of said wall unit.
Figure 33:
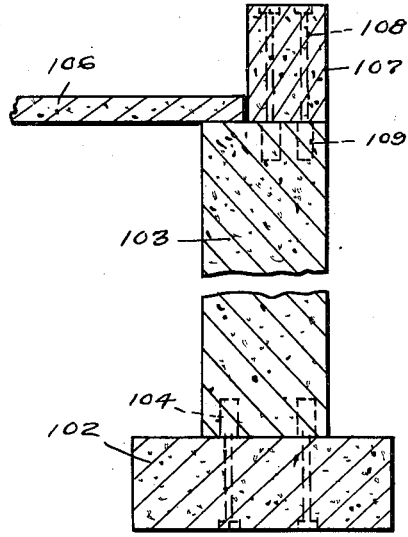
Figure 33 is a fragmentary vertical sectional view of a demountable wall unit.

Referring now to the drawings in detail, the invention comprises a building which includes a foundation 5 of concrete or similar construction on which is supported the outer walls 6 having the roof structure designated generally at 7 supported thereon. The foundation 5 and side walls 6 are integrally cast, as shown to advantage in Figures 8, 13 and 14 of the drawings, and each of the side walls includes an outer main wall section 8 and an integrally cast inner wall section 9 spaced from the main wall section to provide an air space 10 therebetween which is closed at its bottom, as shown to advantage in Figure 15. The inner wall section 9 terminates below the top of the main outer wall section 8 and provides a shoulder 11 on which the edge of the ceiling unit 12 is supported.

The foundation 5 is of a width greater than the wall sections 6 to provide a shoulder 13 on which the edge of the floor units 14 are supported.

Figures 1, 2:
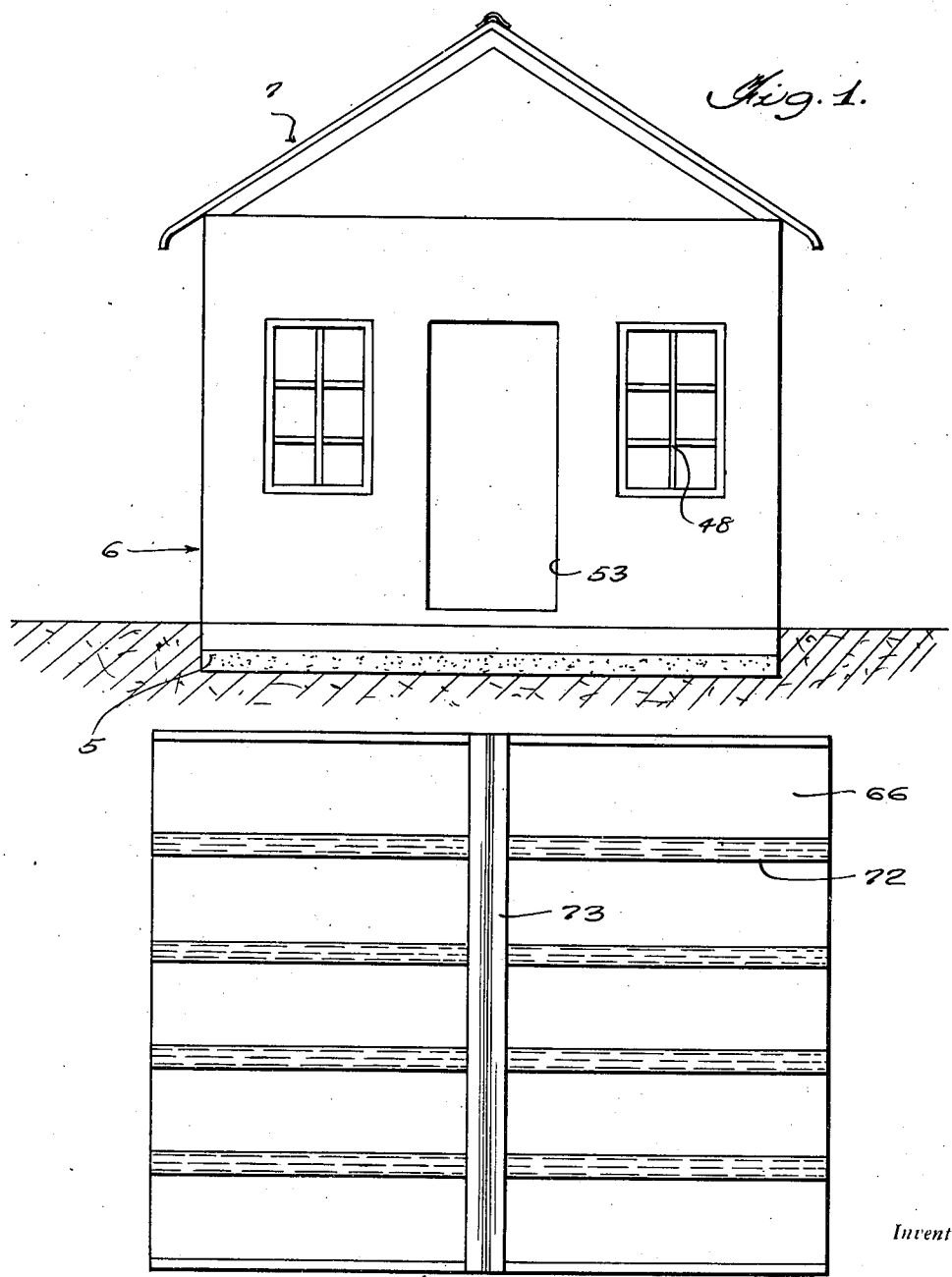
Figure 1 is a side elevational view.
Figure 2 is a top plan view.
Figure 3:
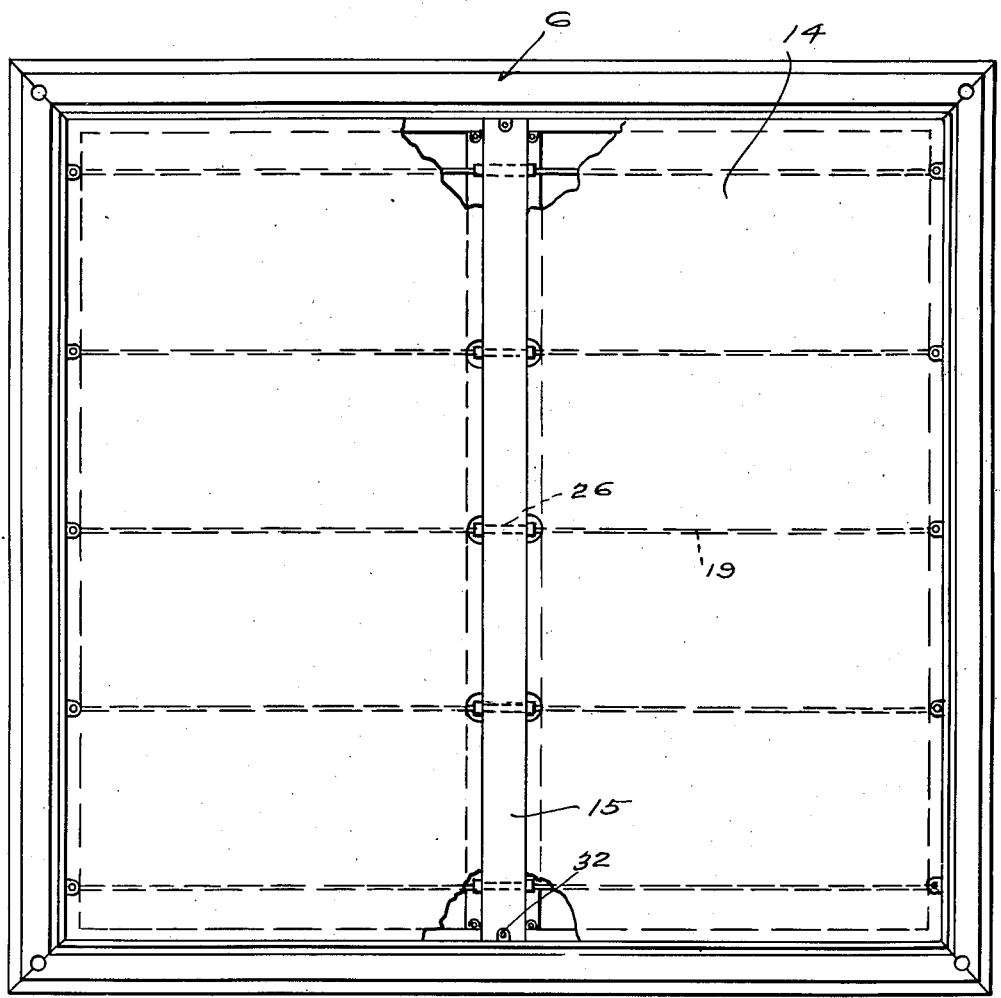
Figure 3 is a plan view of the floor with the roof removed.
Figure 4:
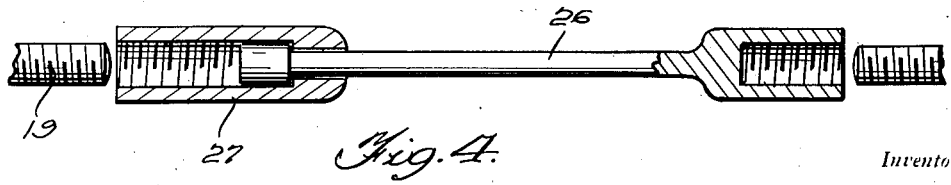
Figure 4 is a detail, with parts in section of one of the connecting links for the floor units at opposite sides of a partition wall.

The building also includes an inner partition 15 supported on a foundation 16 to separate the building into rooms as shown in Figure 3 of the drawings.

The main wall section 8 is provided with reinforcing rods 17, it being understood that the wall units as well as the partition, floor and ceiling units are constructed of precast plastic material and the main wall section as well as the inner wall section 9 are connected by reinforcing stirrups 18 arranged at vertically spaced intervals to prevent separation of the wall sections.

Each of the floor units 14 have reinforcing rods 19 positioned therein, one end of the rod terminating in a recess 20 formed in the floor unit and formed into an eye 21 for receiving a pin 22 which is also inserted through the eye portion 23 of a rod 24 embedded in the wall unit.

Transverse openings 25 are formed in the inner partition 15 adjacent the base 16 and through which links 26 are positioned having sockets 27 at the ends thereof for threaded engagement with the rods 19. The partition 15, as well as the base, also has reinforcing rods 28 and 29, respectively, therein, having eyes 30 and 31 at the ends of the rods for receiving pins 32 and 33 engaging rods 34 and 35 embedded in the side walls.

The ends of the wall sections 8 are formed with vertical grooves 36 having eyes 37 positioned therein formed on the ends of the reinforcing rods 17. The ends of the walls at the corners of the building are beveled as shown at 38 in Figures 16, 17 and 18 and the eyes 37 of the abutting walls are adapted for positioning in aligned overlapping relation for receiving vertical rods or pins 39 inserted therethrough for anchoring the edges of the walls together.

The roof I-beams 12 are supported on the shoulders 11 of the main wall section 8 and the inner wall section 9, the beams and the wall having overlapping rods 40 and 41 provided with eyes for receiving pins 42.

In the lower portion of the inner wall section 9 are formed a plurality of clean-out openings 43 for removing the casting sand after the wall is set to form the air space 10 between the wall sections.

As shown in Figures 21 and 22 of the drawings, the wall units may be formed with window openings 44 in one edge of which are formed a plurality of recesses or pockets 45 and 46, the pocket 45 being adapted to slidably receive a shutter 47 while the pocket 46 is adapted to slidably receive a window sash 48. The edges of the window opening opposite from the pockets 45 and 46 are also formed with shallow recesses or pockets 49 and 50 to accommodate the edges of the shuutter and the window when the same are in closed position. The edges of the recesses 46 and 50 for the window may also be provided with weather stripping 51 of a suitable character. The pocket 46 is sealed from the adjacent dead air chamber 10 by means of a lining strip of sheet metal 46' having its vertical edges embedded in the wall sections 8 and 9.

Outwardly of the shutter 47 a metal screen frame 52 may also be mounted in the window opening.

A door opening 53 is also provided having a recess or pocket 54 in one side edge thereof for slidably receiving the door 55 and screen 56.

Tracks 57 and 58 are suspended from the upper edge of the pocket 54 by rods 59 and 60 embedded in the wall and secured in position by reinforcing rods 61. Brackets 62 and 63 extend upwardly from the door 55 and the screen 56, respectively, and on which are journaled rollers 64 and 65 for travelling in the tracks 57 and 58.

Figure 5:
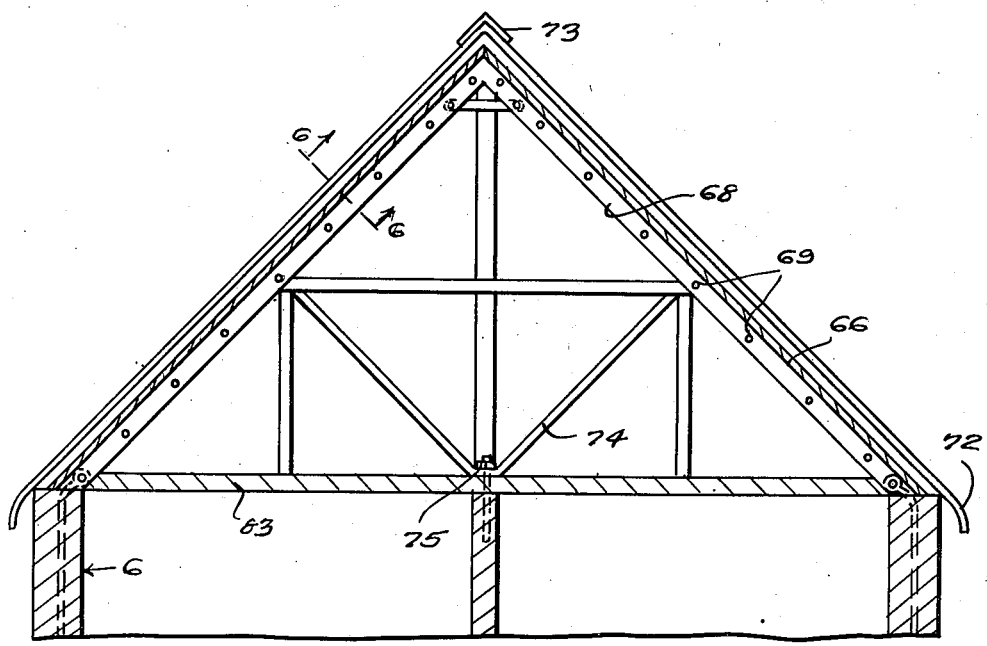
Figure 5 is a vertical sectional view of the roof structure.
Figure 6:
Figure 6 is a sectional view taken substantially on a line 6—6 of Figure 5.
Figure 7:
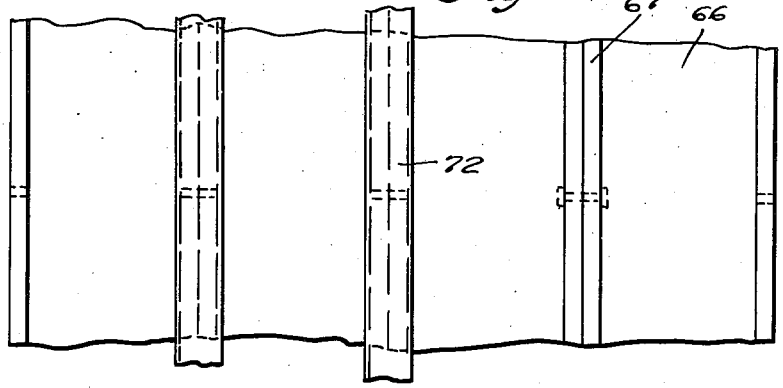
Figure 7 is a fragmentary plan view of the roof construction.

The roof construction is illustrated in detail in Figures 5, 6 and 7 and embodies a plurality of roof panels 66 having their lower edges resting on the walls 6, the panels extending vertically and are provided at their side edges with upwardly extending flanges 67 and downwardly extending flanges 68. The flanges of adjacent roof panels are disposed in flatwise engagement and the lower flanges 68 are connected by bolts 69.

The outer surfaces of the upper flanges 67 are provided with grooves 70 for receiving the inturned edges 71 of substantially U-shaped clips 72 which are positioned over the upper edges of the flanges. The peak of the roof is covered by a cap 73.

The underside of the roof may be supported by a brace construction indicated generally at 74 which is bolted to the partition 15 as at 75.

The ceiling construction is illustrated in detail in Figures 19 and 20 and includes the beams 12 of substantially I-beam construction having the reinforcing rods 76 therein as well as the reinforcing brace member 77 which includes upper and lower longitudinal members 78 connected by inclined brace members 79.

The lower edges of the beams 12 are provided with shoulders 80 on which the upwardly offset edges 81 of ceiling pans 82 are supported. When the pans 82 are positioned between the beams, the same are then covered with a layer of cement or concrete 83, the concrete having reinforcing rods 84 extending therethrough and also extending through openings 85 in the beams 12.

In Figure 28 of the drawings, I have illustrated a metal corner protector 86 for the outer corners of the walls 6, the protector being substantially in the form of a U-shaped clip having the edges thereof seated in notches 87 formed in the adjacent surfaces of the walls, the protectors serving as a weather strip to prevent the entrance of water in the edges of the corners of the building.

In Figure 29 of the drawings, the edges of the corners of the walls are shown sealed by a caulking strip 88.

Figures 30, 31 and 32 represent a modified form of connecting rod for the overlapping eyes of adjacent edges of the building walls, in this form of the invention the rods being of oval-shaped formation in cross-section as shown at 89 and adapted for insertion in the aligned eyes in the position as shown in Figure 31 whereby upon a turning movement of the rods to draw the adjacent ends of the walls together, as shown in Figures 30 and 32.

In Figure 25 I have illustrated a sectional view of the connected ends of two wall units and embodying a construction for tying the walls together for larger buildings.

The adjacent walls are designated at 90 and 91 having a vertical channel 92 in the outer surface of the walls at the abutting edges thereof and into which the ends of the reinforcing rods 93 project in overlapping relation. Cable clamps 94 are employed for connecting the ends of the rods 93 together.

The channel 92 is closed by a shell 94 laid in sections in superposed relation against the outer surface of the walls and secured in position by tie wires 95 attached at one end to the rods 93 and having their other ends attached to metal loops 96 embedded on the inner surface of the shell. After the shells 94 have been secured in position, the channel 92 may then be filled with poured cement, thus acting as a bond for the adjacent ends of the walls.

Figures 26 and 27 represent a modified form of wall construction in which the wall may be reduced in weight, the wall being constructed as heretofore explained and composed of the main or outer wall section 97 and the inner wall section 98 spaced therefrom and connected thereto by the stirrups 99. The inner face of the outer wall section 97 is formed with a plurality of recesses 100 separated by intersecting ribs 101 as shown to advantage in Figure 26, the recesses thus materially reducing the weight of the walls.

Figures 33 to 36, inclusive, represent a knockdown wall construction and include the foundation 102 upon which the walls 103 are supported in upright position, the lower edge of the walls having threaded metal sockets 104 embedded therein adapted for threadedly receiving bolts 105 extending upwardly through the foundation. The ceiling 106 has one edge resting on the top of the wall and also supported on the upper edge of the wall outwardly of the ceiling is the fire wall 107 likewise connected in position by the bolts 108 and sockets 109.

Figure 34:
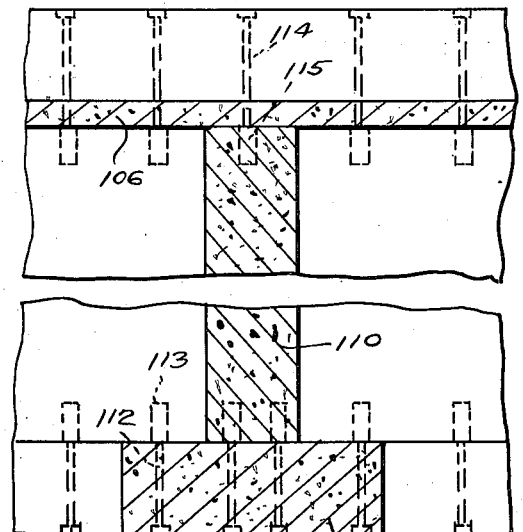
Figure 34 is a similar view of a partition wall for the demountable or portable building construction.

As shown in Figure 34, the partition 110 is also secured in position on a foundation 111 by the bolts and sockets 112 and 113 and likewise anchored to the ceiling by bolts and sockets 114 and 115.

Figure 35:
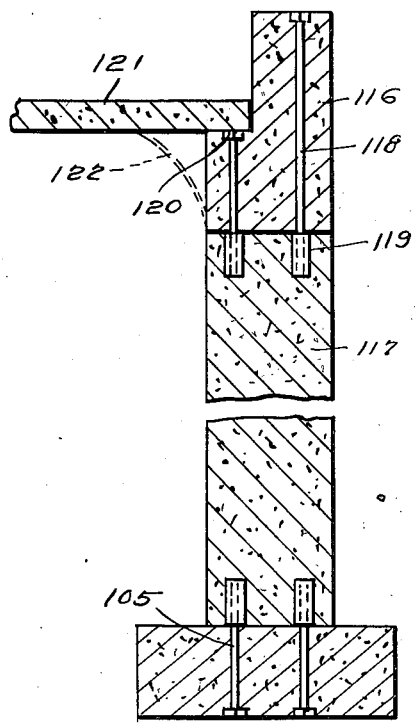
Figure 35 is a similar view of a modified construction of fire wall for the portable building.
Figure 36:
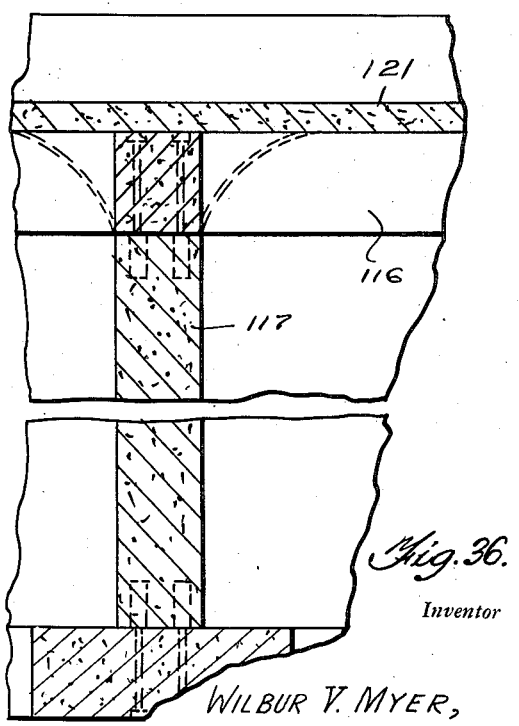
Figure 36 is a similar view of one of the inner partitions therefor.

Should it be desired to raise the height of the ceiling, a fire wall 116, as shown in Figures 35 and 36, is provided which rests upon the wall 117 and is secured thereto by the bolts 118 and 119. The fire wall at its inner edge is provided with a shoulder 120 on which the ceiling 121 rests.

The dotted lines represented at 122 indicate a finishing molding that may be secured in position at the corners of the walls and ceiling.

In Figure 37 I have illustrated a further modified wall construction for a knock-down type building of two or more stories and includes a lower wall section 123 having metal loops 124 projecting upwardly therefrom. The upper wall section 125 rests on the lower wall and is formed on its bottom with similar loops 126 adapted to align with the loops 124 for receiving a retaining pin 127.

The upper wall is of a width less than that of the lower wall to provide a shoulder 128 on which the edge of the floor slabs 129 rest, the slabs preventing removal of the pins 127.

The upper inner surface of the upper wall is also formed with a shoulder 130 to provide a support for the ceiling.

In constructing the wall units, a pouring table or shallow mold of any suitable size and construction is placed on the ground and the facing rocks or stones 131 are fitted closely together therein and cement mortar poured between the joints. The rocks are then prepared in the usual manner to receive the concrete, which is poured to the desired thickness on the back of the facing formed by the rocks or other facing material to form the outer wall 8.

The metal reinforcing network or rods are then laid on the wet concrete and pushed therein to become embedded in the desired position, the ends of the rods being formed with the eyes 37 or other desired fastening devices which project from the edges of the wall to tie adjacent walls, floors, ceiling or other precast units thereto.

The stirrups 18 are pushed at one end into the wet concrete and project therefrom and after the concrete becomes sufficiently hardened, a coating of asphalt emulsion in water is applied to provide a moisture-proof coating on the inner surface of the wall.

A layer of sand or similar chemically inert material to a depth of approximately three inches is then placed on the hardened concrete on top of which is poured a layer of concrete to form the inner wall 9 which is united at one edge with the outer wall to form the foundation 5. The inner wall may also be reinforced as heretofore explained and is maintained in spaced relation to the outer wall by the stirrups 18.

After the walls are set, the sand may be drained through the openings 43 and the walls are then ready for assembling.

It is believed the details of construction and manner of use of the device will be readily understood from the foregoing without further detailed explanation.

Having thus described the invention what is claimed is:

In a building construction, a wall unit of plastic material including a base portion forming a foundation, said wall unit having a vertical groove at its side edge, eyes in the groove anchored in the wall, the eyes of adjacent units overlapping, and a retaining rod inserted in said eyes, said rod being of oval shape in cross-section and adapted to draw the edges of the walls toward each other upon a partial rotation of the rod.

WILBUR V. MYER.